United States Patent Office 2,967,457
Patented Jan. 10, 1961

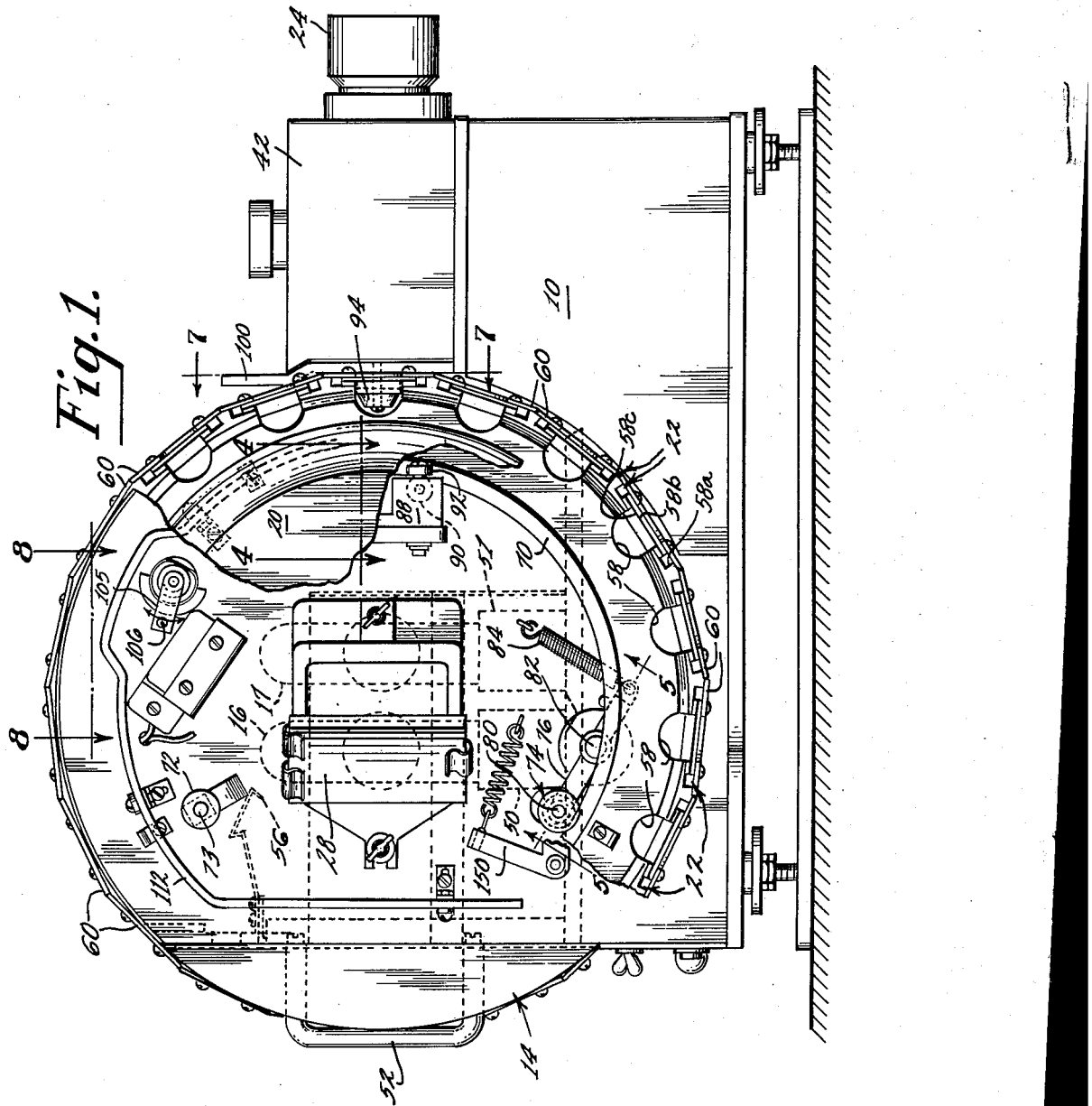

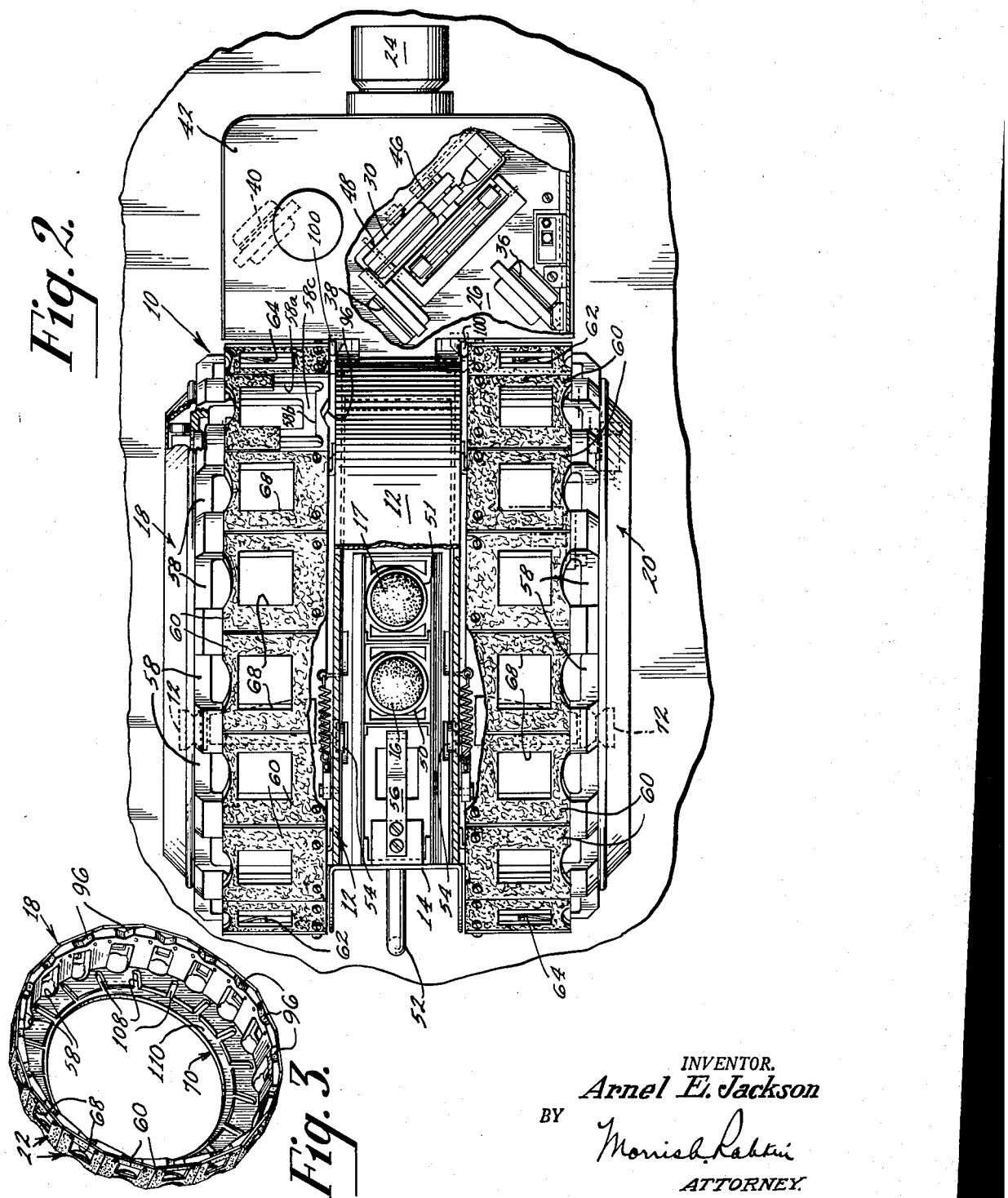

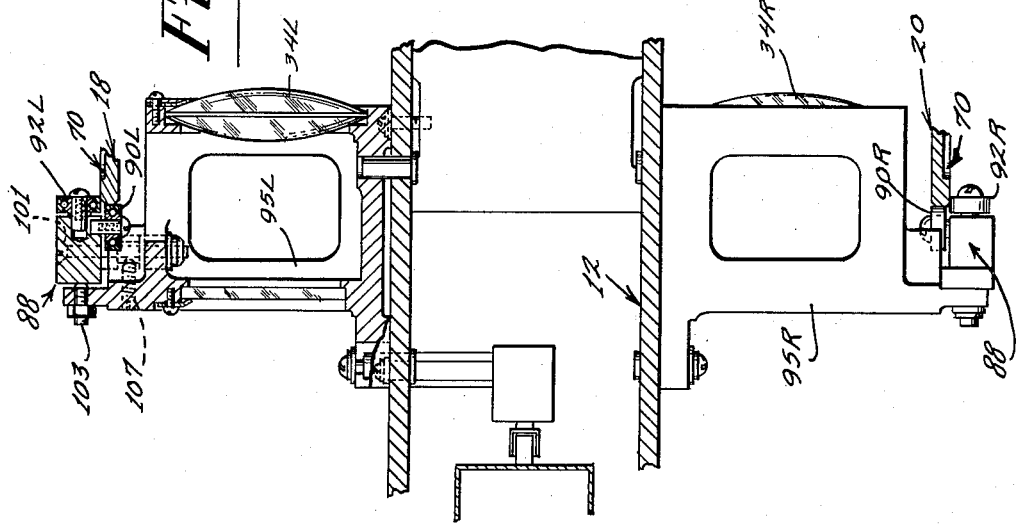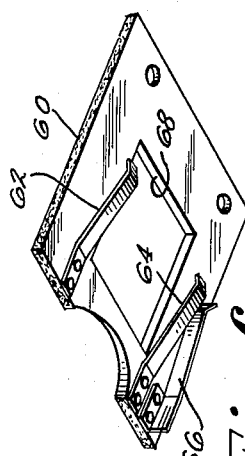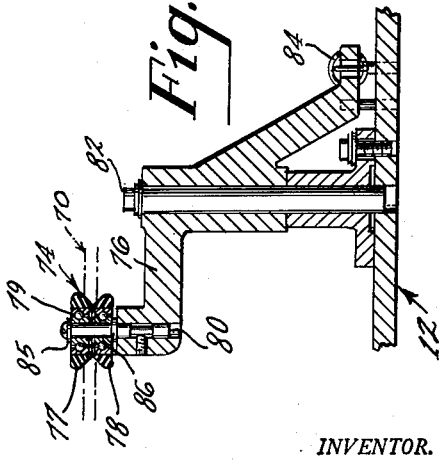

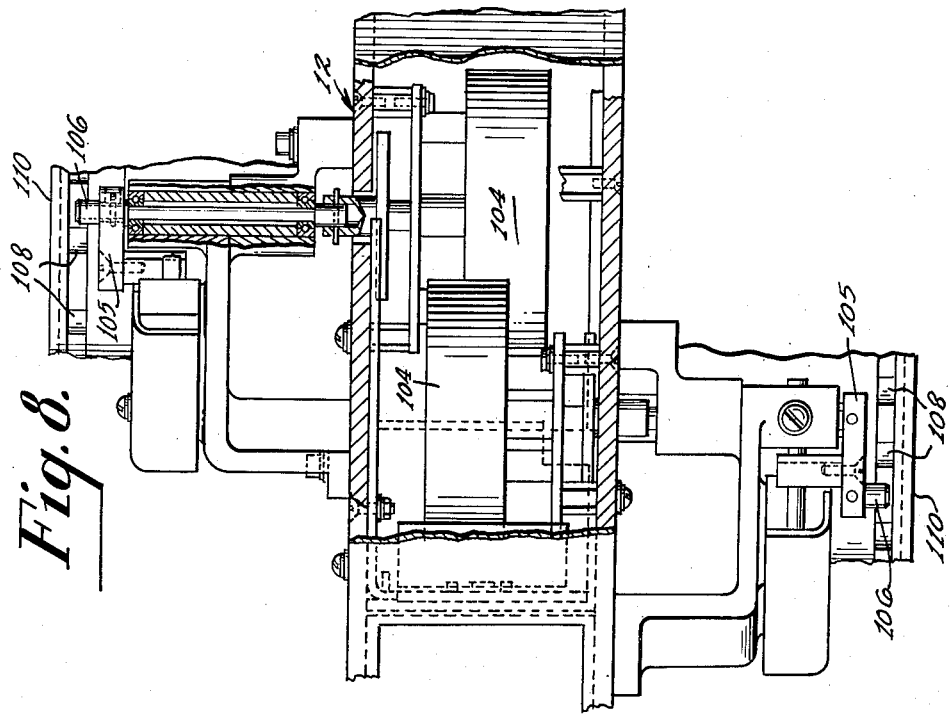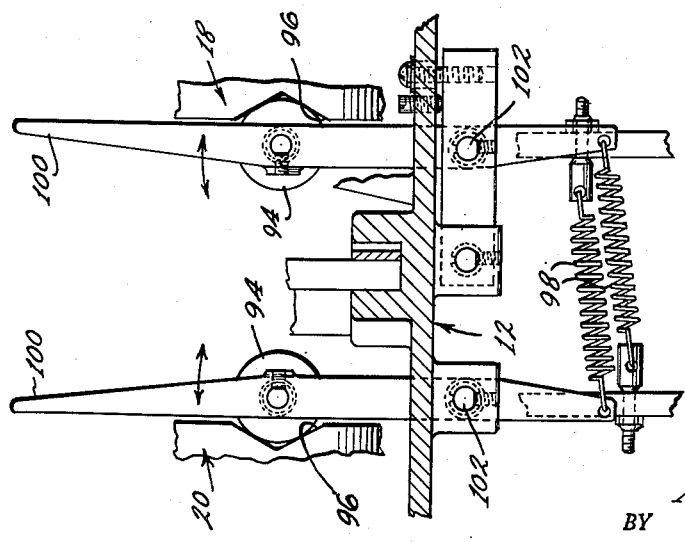

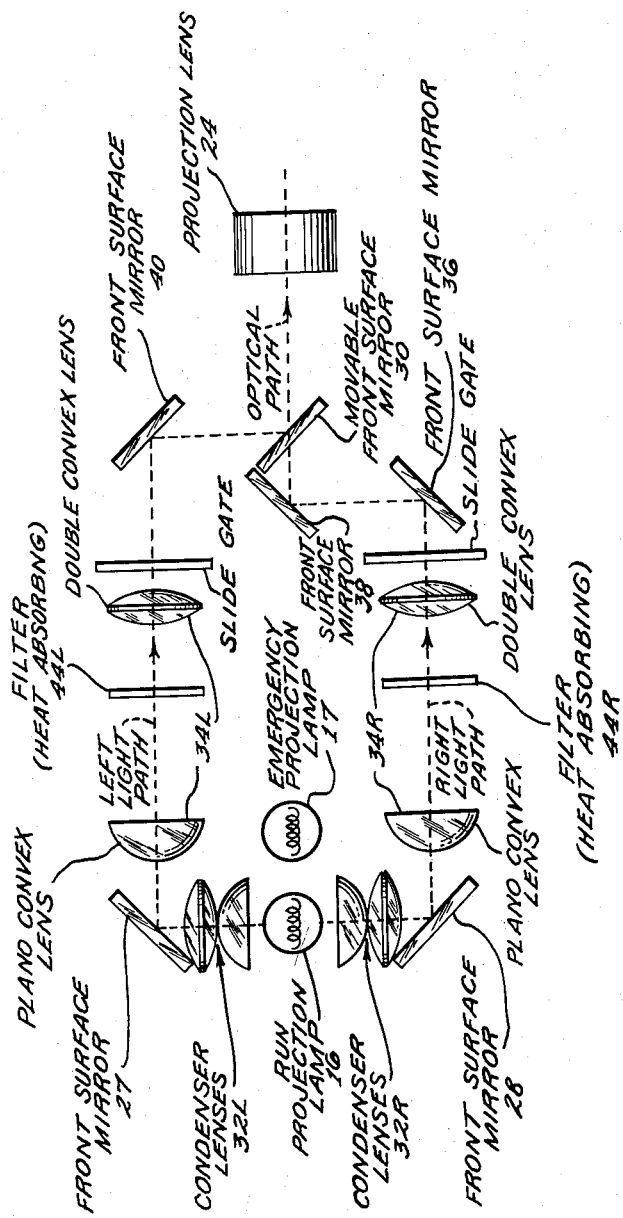

2,967,457
DUAL DRUM SLIDE PROJECTOR

Arnel E. Jackson, Audubon, N.J., assignor to Radio Corporation of America, a corporation of Delaware Filed May 6, 1957, Ser. No. 657,189

2 Claims. (Cl. 88—27)

This invention relates to slide projectors.

Slide projectors are used extensively in modern television stations. To facilitate operations, many varied messages are put on film slides, such as station identifications, commercials, titles for programs, and the like. Due to the fact that television broadcasting is an expensive operation, and that time is a very valuable commodity, it is desirable that a slide projector serve the needs of television stations by incorporating the following features:

(1) Quick, almost instantaneous change from one slide to another.

(2) Large capacity to handle broad segments of a program day, but not so large as to complicate operations.

(3) Near foolproof, but flexible, operation with provision for easily checking continuity of slides and for making last minute changes without hampering operations.

(4) Manual or automatic operation.

Therefore, to achieve the above and other desirable features, it is an object of this invention to provide a novel dual drum slide projector.

A further object is to provide a slide projector embodying improved slide supporting means whereby a slide is maintained in proper registration.

Still another object of this invention is to provide a novel means for rotatably supporting two slide carrying drums.

In accordance with this invention, a novel slide projector is provided which incorporates two drums, each adapted to carry slides about its periphery. The drums are rotatable about a common axis. Between the two drums, a frame member houses a light source. Light from the source is reflected by mirrors within the drums to provide two beams of light for slide viewing, one beam for each drum. Means are also provided to select optically one of the two beams to be passed through a projection lens for viewing. According to other features of the invention, "spill-over" light within each drum is diffused to illuminate other slides about the periphery of the drums. Each drum is mounted on three, and only three, sets of rollers for accurate alignment for rotation. The rollers project from the frame member; three rollers on one side, and three rollers on the opposite side of the member. One roller is rotatable about a fixed axis; one roller is spring biased about a movable axis to maintain sturdy support of the drum and to facilitate removal of the drum; and the third roller includes a pair of bearings at right angles to each other to provide accurate lateral and longitudinal adjustment of one drum with respect to the other. Each roller engages a circular flange on a drum so as to hold the drum onto the frame. Slide holders, mounted about the periphery of each drum, are provided with spring fingers, so that slides may be positioned accurately against accurate machined faces to achieve lateral, longitudinal and focal alignment.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 is a front elevational view, partly in section, of a slide projector embodying the invention;

Figure 2 is a top view, partly in section, of the projector shown in Figure 1;

Figure 3 is an internal perspective view of a drum for use in the projector;

Figure 4 is a detail, in cross section, showing the bearings for engaging a flange on each drum, taken across the section 4—4 of Figure 1;

Figure 5 is a detail of a spring biased roller taken across the section 5—5 of Figure 1;

Figure 6 is a detail of a cover plate for a slide holder, with its associated spring fingers;

Figure 7 is a detail of the detent mechanism for accurately registrating the drums, illustrating portions of the drums, taken along the section 7—7 of Figure 1;

Figure 8 is a detail of the Geneva mechanism, for rotating the drums, taken along the lines 8—8 of Figure 1; and Figure 9 is a schematic of the optical system employed by the projector.

With reference to Figures 1 and 2, the projector 10 comprises a frame member 12 which houses a sliding drawer lamphouse 14. The sliding drawer lamphouse assembly 14 is a device for housing a light source, such as a projection lamp 16, and may house a spare, or emergency lamp 17.

Slide carrying drums 18, 20 are coupled to opposite sides of the frame member 12 in suitable fashion so that they are rotatable about a common axis. Slides may be mounted in slide holders 22 located about the periphery of the drums 18, 20. A projection lens 24 is located at the front of the projector 10. Selective optical means 26 are interposed between the drums 18, 20 and the lens 24.

In operation, light is emitted from the lamp 16 so that the light enters the drums 18, 20. Light is reflected by a mirror 27, 28 located within each drum 18, 20 (see also Fig. 9 and note mirror 28 visible in Fig. 1) so as to reflect light toward the front of the projector 10. Light passes through slides held by the forward slide holders. One of the two beams of light is optically selected by means of an assembly 26 and passed through the projection lens 24.

The optical system used in the projector is shown schematically in Fig. 9. A single projection lamp 16 is used to illuminate two optical channels. A combination of front surface mirrors multiplex these two channels through a single projection lens 24, so that a slide in either channel may be projected on demand. A moving mirror 30 in the multiplexing system is utilized to accomplish this changeover.

The projection lamp 16 is positioned with its filament plane coincident with the projection lens axis. Symmetrically located on each side of the projection lamp are condenser lenses 32L, 32R. These collect the light from both sides of the lamp filament to form two beams going in opposite directions. Front surface mirrors 27, 28 fold the light beams to direct them parallel to and equidistant from the projection lens axis. A second pair of lenses 34L, 34R in each channel relay the light beams to the slide gate positions. These positions are immediately in front of the fourth lens element.

In the right-hand (lower) channel, two fixed front surface mirrors 36, 38 located immediately in front of the slide gate position are arranged to "periscope" the optical path to the center of the projector 10, where it coincides with the axis of the centrally located projection lens 24. Hence, the slide in the right-hand channel is projected whenever the projection lamp 16 is on, unless its optical path is blocked by some means.

The assembly 26 includes, as a means for blocking this path, a moving mirror 30 as one component of the two-mirror periscope 40, 30 arrangement used to fold the left channel optical path to coincide with the axis of centrally located projection lens 24. The mirrors 40, 30 forming the periscope for the left channel are located forward of those in the right channel. The mirror 30 located on the central axis of the projector 10 is mounted on a pivot so that it may be rotated in or out of the optical path. When it is in the optical path, the left side (upper) periscope is complete.

Light from the left-hand (upper) channel reaches the projection lens 24 causing the slide in this channel to be projected. At the same time, the opaque back of the mirror 30 blocks off all light from the right channel. As the mirror 30 is moved out of the optical paths, with a motion parallel to the plane of its reflective surface, some of the light from the left channel falls off the edge of the mirror 30 and does not reach the projection lens 24. However, part of the right channel optical path is no longer blocked so that the same proportion of light lost in the left channel now reaches the lens 24 from the right channel. In effect, this offers a lap dissolve type of transition. Because of the physical location of the mirror 30 with respect to the projection lens and slide, this lap dissolve is of the localized area type, which begins at one edge of the image and wipes rapidly across to the other edge to complete the transition. Black opaque surfaces are utilized on the back of the moving mirror 30 and inside the cover 42 to absorb the light from the channel not being projected.

An infrared filter 44L, 44R is inserted in each optical channel between the third and fourth condenser lens elements 34. The filters 44 absorb much of the heat in the light beams so that slides may be projected for extended periods without overheating. The filters 44 have been selected to give a color temperature match with other motion picture projectors which may be used in the same color film chain.

The two optical channels are essentially identical, thus making smooth programming continuity possible by sequential operation. During the "show" period of one channel, the slide in the other one can be changed, and that other channel readied for the next slide "showing."

The use of fully reflective front surface mirrors throughout both optical channels and the use of only one projection lamp are highly advantageous from the point of view of source color temperature match between the two channels. The standard projection lamp used in an operative embodiment is a 300-watt medium prefocused base type which provides approximately 450 foot-candles illumination incident on a 3.35 by 4.46 inch screen. This is ample light for some color film cameras. Should additional light be desired, a 500-watt lamp can be used. The cooling system is adequate, even with a 500-watt lamp, to keep the temperature rise of slides in the gate to a safe amount. If desired, of course, a higher or lower wattage lamp may be used.

The uniformity of illumination is excellent. The brightness of a 3.35 by 4.46 inch image area is not less than 90 percent of maximum at any point in this area when the illuminated field at the projector gate is the transmitted picture area size specified in ASA PH 22.94—1954 and the measurement is made in accordance with ASA PH 22.91—1955, par. 8.3.3.

The optical system discussed above is illustrated and described in a copending application assigned to the assignee of this application by K. Sadashige, entitled "Optical Projector," filed September 21, 1955, Ser. No. 535,672, now abandoned.

The manner and speed of mirror motion required to provide the illusion of instantaneous slide-to-slide switch are important factors in determining the design of a mirror moving mechanism. As noted previously, the moving mirror 30 is located at the intersection of the two optical channels and moving the mirror 30 in a plane parallel to its reflective surface gives a wipe type of lap dissolve transition. In normal operation, this transition takes place in less than ⅕ second, providing a very acceptable illusion of instantaneous switching.

A reversible shaded pole gear-head motor (not shown) coupled to the mirror 30 through a restricted type of Geneva movement 46 provides the means for rapid movement of the mirror 30 into and out of the optical paths. The mirror 30 and its mount are pivoted on a shaft 48 which is perpendicular to the reflective surface. This permits mirror motion only in the plane established by this surface. Proportions are such that the mirror 30 and its mount traverse an arc roughly equivalent to one station of a five station external Geneva mechanism. The pin wheel is reduced to a simple crank and pin and is coupled to the drive motor through a friction clutch. The crank travel is limited in both directions by stops. The friction clutch reduces inertia shock on the motor gear train when the crank strikes its limit stops. Lever type sensing switches are operated by the crank near each end of its travel. The crank is detented in these positions to prevent spring back when the motor is de-energized and to maintain proper pressure on the sensing switches.

Actual mirror motion is less than ⅕ second, yet the comparatively gentle accelerating and decelerating forces inherent in this type of mechanism gives smooth, quiet operation. Such a mechanism for moving the mirror 30 is shown generally in Fig. 2. Details of the moving mirror mechanism are not essential to an understanding of this invention.

One feature of the subject projector is a spare projection lamp position. In case of failure of the regular lamp 16 during a show, the stand-by lamp 17 may be quickly moved into operating position.

The quick change is achieved manually. Two lamp sockets 50, 51 are attached to a sliding drawer type lamphouse 14. When the drawer 14 is in the forward position (i.e. toward the right as viewed in Figs. 1 or 2), the regular projection lamp 16 is in position to operate. By pulling back on the lamphouse handle 52, the drawer 14 is moved backward to bring the "emergency" lamp 17 into projection position. A sensing switch (not shown) associated with the lamphouse position keeps the proper lamp socket 50, 51 energized. The drawer 14 is held against the positioning stops by the use of spring loaded rollers 54 (for simplicity of illustration, shown only in Fig. 2).

A spring type catch 56 serves as a positioning stop for the lamphouse 14 in the rear or emergency position. To replace lamps, this catch may be disengaged by depressing it and the lamphouse 14 withdrawn farther to provide access to both lamps. A final stop is used to prevent accidentally withdrawing the drawer all the way, when replacing lamps.

When the lamphouse 14 is in the emergency position, its out-of-place appearance is an immediate indication of an emergency change. This serves to remind the operator that an emergency change has been made, and that the burned out lamp needs replacement. After making this replacement, the lamphouse 14 may be returned to its original position.

The sliding drawer lamphouse assembly is further described and illustrated in a copending patent application assigned to the assignee of this application by Arnel E. Jackson et al., entitled "Lamphouse Assembly for Projection Lamp," filed March 26, 1957, Serial No. 648,586, now abandoned.

Referring to Figure 2, there are shown two drums 18, 20 mounted with their rotational axis in a horizontal plane which provide a total capacity of 36 slides . . . sufficient to handle most broadcasting needs. (By suitable dimensional changes, the capacity of the drums may be increased or decreased, as desired.) Individual slide-holding wells 58 located around the periphery of the drums 18, 20 are easily loaded by inserting slides in the well openings facing the exposed end of the drums. (See Figs. 1 and 2.) This permits access to all slide positions at all times for loading and unloading.

Slides are located by accurate machining of three surfaces on each slide well recess 58. In this manner, it is possible to attain any degree of registry desired by controlling the location of the picture area with respect to the reference edges when the slide is being prepared. One of these surfaces 58a locates the bottom edge of the slide to provide vertical positioning. One 58b locates a vertical edge of the slide to provide horizontal positioning and the third surface 58c locates the face of the slide to provide focal plane positioning. One drum on the projector 10 is machined opposite hand so that the slides in both channels will be registered from their bottom edge.

A cover plate 60 (see Fig. 6 which shows an underside view thereof) for each slide position has three finger springs 62, 64, 66 which maintain the slide against the focal plane registration surface 58c and vertical registration surface 58a. The friction created by the spring pressure on these two surfaces 58a, 58c maintains slide contact with the horizontal registration surface 58b. The cover plates 60 that support the springs 62, 64, 66 have a masking aperture 68 that roughly trims the projectable picture area to the 3 by 4 aspect ratio required by television. Finger room is provided at the slide wells 58 to permit grasping the slides by the edge for unloading.

The drums 18, 20 are supported in a unique arrangement which offers easy access to optical components for cleaning. A female or internal flange 70 at one end of the drum casting provides a support rim of large internal diameter. Three sets of rollers equally spaced around its circumference engage the rim 70 in a manner to provide support and rotational freedom. Two of these roller sets 72, 74 are split V type. (See Fig. 1 and Fig. 5.) They straddle the rim 70 of the drum flange and provide lateral positioning. One set 72 of these V rollers rotates about a fixed axis 73. The other set 74 of these V rollers is mounted on a spring loaded arm 76 to eliminate axial and radial play.

Referring now to Figure 5, which shows the spring biased roller 74 assembly in greater detail, there is shown the roller 74 which comprises two half-rollers 77 and 78 mounted upon suitable bearings 79 so that a cross sectional outline of the rollers 77, 78 forms a V. The split V roller 74 rotates about a movable axis 80. The axis 80 is coupled to an arm 76 which is pivotally connected about an axis 82 which is fixedly connected to the frame member 12. A spring 84 connects the arm 76 to the frame member 12 thereby biasing the split V roller 74. As the rim of the flange 70 rides in the split V roller 74, pressure is applied outwardly upon the roller halves 77, 78 biasing each roller half against a stop 85, 86 to assure that the flange 70 is centrally located in the V. The action of the split V roller tends to increase stability of a drum against vibration in its axial direction. In practice, the space between each roller half, forming the V, is very small.

The spring biased arm 150 is pinned to a shaft (not shown) concentric with axis 80. This arm 150 is illustrated as broken off because it pertains to a mechanism which need not be described for an understanding of the present invention. The arm 150 and its function are more fully described in the above-mentioned copending application of A. E. Jackson et al.

The third set of rollers 88, located near the gate, is used for accurate positioning and registration. Their centers are preferably located in the horizontal plane passing through the center of the slide shown position. This set of rollers 88 consists of two ball bearings 90, 92 having their center lines perpendicular to each other. One of these bearings 90 rides against the internal circumference of the drum flange 70, and the other of these bearings 92 rides against the face of the flange 70.

The bearing 90 that contacts the internal circumference of the flange 70 provides longitudinal positioning along the line of the optical axis. The focal plane reference surfaces 58c of the slide holding recesses are accurately machined with respect to this circumference, so that this bearing 90 becomes the means of maintaining accurate focal registry between slide positions. The spring loaded V roller arm 76 provides proper pressure to maintain constant contact between the bearing 90 and the flange 70.

The bearing 92 that operates against the flange 70 face provides lateral positioning with respect to the optical axis. The horizontal registrating surfaces 58b of the slide holding recesses on the drums 18, 20 are machined accurately with respect to the flange face surface, so that horizontally registry between slides is accurately maintained. The drum flange 70 is kept in contact with this bearing 92 by the pressure of a large spring loaded nylon roller 94 riding on the back edge of the drum. (See Fig. 7.)

As shown in Fig. 4, an arm 95 connects the bearings 90 and 92 in place away from the frame member 12. The arm 95 may also house the lens 34. As shown in Fig. 4, the suffix L to a numeral designates components on the left side of the projector 10, and the suffix R to a like numeral designates like components on the right side of the projector 10.

Referring now to Fig. 7, there is shown the detent mechanism in detail.

Rotational positioning to provide vertical registry between slide positions is accomplished through a series of detent notches 96 on the back edge of each drum 18, 20. There is a notch 96 for each slide position. The nylon roller 94, loaded by a spring 98, acts as a detent in these notches 96. The angle of the detent notches and the amount of spring tension are such that once the roller 94 enters the notch 96, it will drive the drum 18, 20 until firm seating occurs. A lever 100 is connected to each roller 94 to permit rapid manual rotation of a drum 18, 20 by releasing the roller from contact with the drum.

Removal of the entire drum assembly is accomplished by lifting the spring biased roller 74 by its arm 76. Access to the roller arm 76 is accomplished through the openings in the drums associated with the slide wells 58. After disengaging the spring biased roller 74, the drum may be lifted off the rollers.

In addition to the registry of slide positions, registration between drums is also provided. Minor adjustments of the location of one drum 18 permit alignment with a fixed drum 20, as shown in Fig. 4. Horizontal alignment is accomplished by moving the side drum support bearing 92L with respect to the side of the drum flange 70 by varying a screw 101. Correction for focal plane alignment is accomplished by adjusting the inner drum support bearing 90L by varying a set screw 103. Another set screw 107 is used to lock these adjustments. Spring loading of the drums against these bearings by springs 84 and 98 eliminates play which might be introduced by change in position. Correction for vertical registry is accomplished by raising or lowering the pivot shaft 102 of the roller lever 100.

Each drum 18, 20 has its own drive mechanism based on the internal Geneva principle. Reversible, shaded pole, gear head motors 104 are used. Each motor 104 is coupled through a ball bearing supported shaft to a crank arm 105. A crank pin 106 engages slots 108 cast on the inside face 110 of the drum flange. (See Figs. 3 and 8.) One revolution of the crank 105 advances the drum one slide position. The lock commonly associated with such Geneva movements has been eliminated so that a drum moves freely when the pin 106 is not engaged in a slot 108. This permits manual rotation of the drums at any time, except during the actual power change cycle, and also aids in accurate rotational positioning of the drum. In operation, the drive mechanism 104—106 moves the drum and roughly positions it at the next slide position. The detent linkage 94—102 then takes over and accurately positions the drum to provide vertical registry.

A translucent diffuser element 112, in close proximity to the internal diameter of the drum, collects and diffuses the spill-over light from the main optical system to provide a softly illuminated background for the slides. (See Fig. 1.) This permits visual observation of picture area when loading the slides. It also permits visual checks on orientation, loading sequence, etc. of the slides at any time without removing them from the drum. Since the drums may be readily rotated by hand, a complete check on every slide in the drum can be accomplished quickly.

The basic framework of the projector has been designed to provide rigid support for all components and at the same time permit good accessibility for maintenance and servicing. Two parallel vertical plates attached to a horizontal bottom plate form the basic framework 12 of the projector. The space between these vertical plates houses the lamphouse drawer, the drum drive motors and the control panel. The condenser system, drum supports and drum drive mechanism are mounted on the outside of these plates. A plate type casting near the front of the projector forms a horizontal table to support the selective optical means, the projection lens mount and the drum detent arms.

Covers are provided for each of the three major compartments thus formed. These covers are made of steel to provide magnetic isolation of the motor fields in addition to their individual shields.

For details concerning construction of an operable embodiment, see an article in "Broadcast News," April 1957, entitled "A New 2 x 2 Slide Projector for Television," by A. E. Jackson et al.

This invention is particularly useful for providing the accurate registry and flexibility of operation desired for slide presentation for use in television slide projectors. However, the slide projector described may be used for other purposes, such as for home use.

What is claimed is:

1. A slide projector comprising a frame member for housing a light source, a first slide carrying drum having a female circular flange, first means rotatably coupling said first drum at said flange to one side of said member, a second slide carrying drum having a female circular flange, and second means rotatably coupling said second drum at its said flange to the other side of said member, whereby both drums are rotatable about a substantially common axis; said first means comprising a V roller rotatably connected to a fixed axis affixed to said one side of said member, a spring-biased V roller connected to said one side and spring biased outwardly in a radial direction against said first drum flange, and roller means including a first ball bearing for rotating about an axis parallel to said fixed axis and a second ball bearing for rotating about an axis perpendicular to said first ball bearing axis and said common axis, wherein said first means including said ball bearings engage with said first flange; and said second means comprising a third V roller rotatably connected to a fixed axis affixed to the other side of said member, a fourth V roller connected to said other sides and spring biased outwardly in a radial direction against said second drum flange, and adjustable roller means including a third ball bearing for rotating about an axis parallel to said third V roller fixed axis and adjustable in a direction perpendicular to said common axis and a fourth ball bearing for rotating about an axis perpendicular to said third ball bearing axis and said common axis and adjustable in a direction parallel to said common axis, wherein said second means including said third and fourth ball bearings engage with said second flange; and whereby an adjustment of said third and fourth ball bearings permits both drums to rotate about a common axis and another adjustment of said third and fourth ball bearings permits both drums to rotate about different axes, the distance between said axes being adjustable by said adjustments.

2. A slide projector comprising a frame member for housing a light source, a first slide carrying drum having a circular flange, first means rotatably coupling said first drum at said flange to one side of said member, a second slide carrying drum having a female circular flange, and second means rotatably coupling said second drum at its said flange to the other side of said member, whereby both drums are rotatable about a substantially common axis; said first means comprising a roller rotatably connected to a fixed axis affixed to said one side of said member, a spring-biased roller connected to said one side and spring biased outwardly in a radial direction against said first drum flange, and roller means including a first ball bearing for rotating about an axis parallel to said fixed axis and a second ball bearing for rotating about an axis perpendicular to said first ball bearing axis and said common axis, wherein said first means including said ball bearings engage with said first flange; and said second means comprising a third roller rotatably connected to a fixed axis affixed to the other side of said member, a fourth roller connected to said other sides and spring biased outwardly in a radial direction against said second drum flange, and adjustable roller means including a third ball bearing for rotating about an axis parallel to said third roller fixed axis and adjustable in a direction perpendicular to said common axis and a fourth ball bearing for rotating about an axis perpendicular to said third ball bearing axis and said common axis and adjustable in a direction parallel to said common axis, wherein said second means including said third and fourth ball bearings engage with said second flange; and whereby an adjustment of said third and fourth ball bearings permits both drums to rotate about a common axis and another adjustment of said third and fourth ball bearings permits both drums to rotate about different axes, the distance between said axes being adjustable by said adjustments.

References Cited in the file of this patent

UNITED STATES PATENTS

| | | |
|---|---|---|
| 2,260,321 | How | Oct. 28, 1941 |
| 2,289,811 | Tuttle et al. | July 14, 1942 |
| 2,289,812 | Tuttle et al. | July 14, 1942 |
| 2,319,284 | Zwirn | May 18, 1943 |
| 2,371,666 | Zwirn | Mar. 20, 1945 |